June 6, 1967  J. PINEL ET AL  3,324,340
LINEAR TRAVELLING WAVE PARTICLE ACCELERATOR HAVING
SPACED SHAPED APERTURES
Filed Oct. 2, 1964  6 Sheets-Sheet 6

INVENTORS:
J. PINEL & J. P. MANGIN
BY Paul M. Craig, Jr.
ATTORNEY

United States Patent Office 3,324,340
Patented June 6, 1967

1

3,324,340
LINEAR TRAVELLING WAVE PARTICLE ACCELERATOR HAVING SPACED SHAPED APERTURES
Jacques Pinel and Jean-Paul Mangin, Paris, France, assignors to Compagnie Generale de Telegraphie Sans Fil, Paris, France
Filed Oct. 2, 1964, Ser. No. 401,209
Claims priority, application France, Oct. 8, 1963, 949,869
9 Claims. (Cl. 315—3.5)

The present invention relates to linear particle accelerators operating by interaction with a travelling wave.

FIGURES 1 and 2 of the drawing of the present application are intended to explain the present invention.

FIGURES 3 through 13 illustrate the novel structures of delay lines permitting to realize an accelerator with focusing by the high frequency electric field.

In particular:

Figure 12:
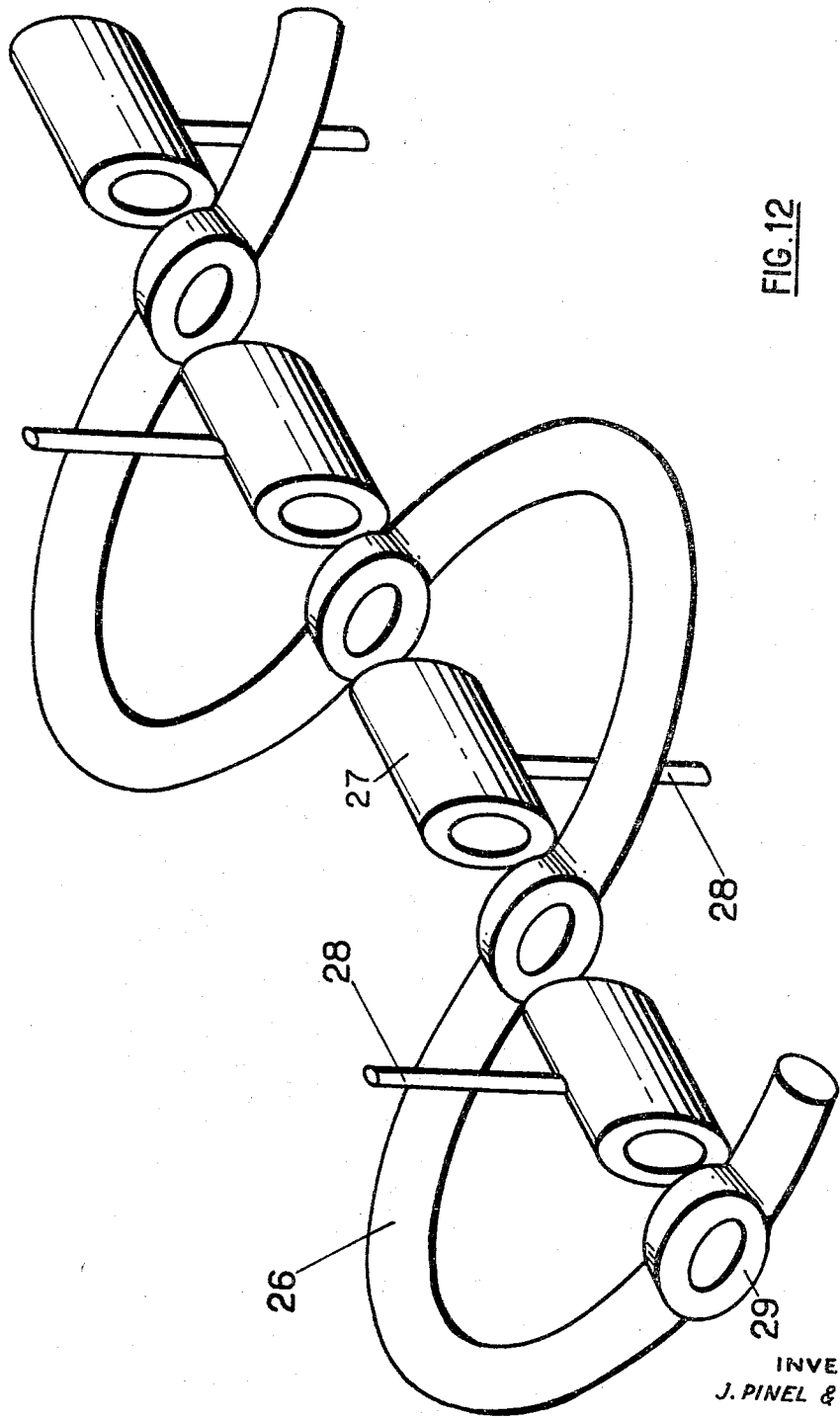
Figure 13:
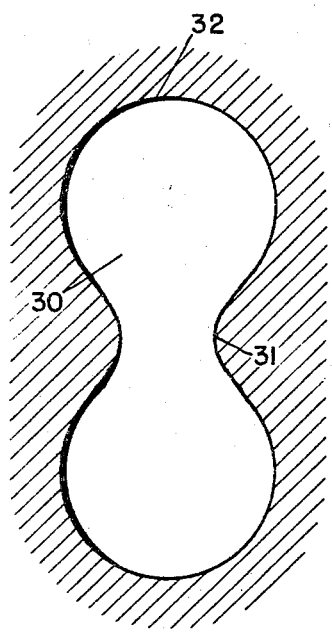

FIGURE 12 is a perspective view of another delay line as disclosed in a copending application assigned to the same assignee and provided with a fourth modification in accordance with the present invention, and FIGURE 13 is a cross sectional view illustrating an orifice of improved shape for use with any of the preceeding modifications or with any modifications within the scope of the present invention.

The linear accelerators operating by interaction with a travelling wave comprise generally a delay line of geometrically periodic structure having a variable pitch, which may be a guide loaded with transverse diaphragms, a meander-type line, an interdigital line, a line with plate-like delay elements, a ladder-type line, etc. The elements of these known structures are pierced within the axis of the line with orifices through which one causes to pass the beam of particles to be accelerated. These orifices are established either in the diaphragms of the line provided with irises, in the fingers of a bar or plate-type line, or in the conductor bent into meander shape, etc. In the known accelerators, these orifices are circular, or at least have an identical form and are positioned identically in space with respect to all the elements of the line.

Figure 1:
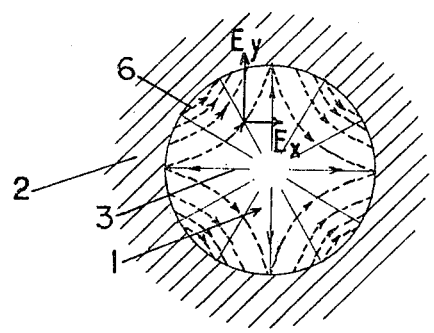
FIGURE 1 represents a transverse cross sectional view through a delay line of an accelerator of known structure, with indication of the distribution of the lines of force of the field of the travelling wave.
Figure 2:
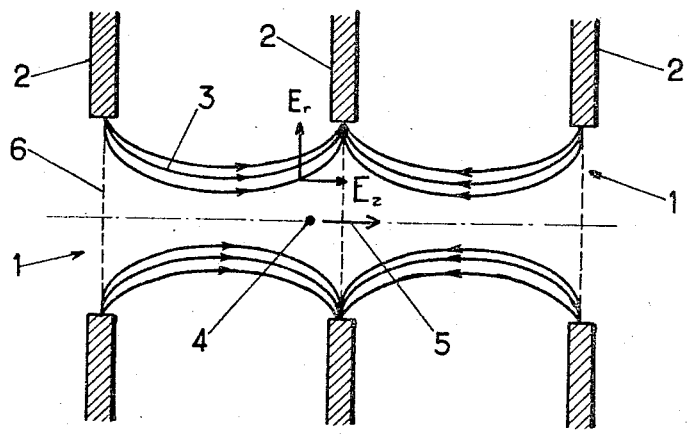
FIGURE 2 represents a longitudinal cross sectional view of the same delay line with indication of the distribution of the same lines of force.

FIGURES 1 and 2 represent respectively, in front elevational and longitudinal cross sectional view, the usual circular orifices 1 which are provided in the periodic elements 2 of a line with variable pitch, whereby these elements may be diaphragms, fingers, plates, bars, etc.

It is known that the electro-magnetic field of the travelling wave which propagates within this line may be decomposed into a sum of space harmonics of which the maximum amplitudes decrease by going from the fundamental (component whose phase velocity is the strongest) toward the higher harmonics of ever higher rank (the phase velocity of which is weakest).

It is also known that the distribution of the space harmonics within a periodic line is alternately symmetric (maximum amplitude within the axis of the line and decreasing in the direction toward the periphery) and anti-symmetric (zero amplitude in the axis and increasing with one or the other polarity by going in one or the other direction toward the periphery). The symmetrical distribution is, for example, that of the fundamental and of the even harmonics, and the anti-symmetric distribution is that of the odd harmonics.

When the beam is concentrated in the neighborhood of the axis of the line, it is desirable to cause the same to propagate with a velocity synchronous with the fundamental space harmonic in such a manner as to enter into interaction with this fundamental whose amplitude is maximum within the axis. This is because the fundamental has a symmetric distribution and its amplitude is also stronger than that of the higher harmonics. A particle having this synchronous velocity sees the field of the fundamental as a constant field which accelerates the same if the pitch of the line varies in such a manner that the condition of synchronism is respected throughout.

Reference numeral 3 designates in FIGURE 2 the distribution of the lines of force of the field of the fundamental; and FIGURE 1 illustrates by the same reference numeral the projection of these lines of force in the transverse plane of the delay line. Reference numeral 4 designates in FIGURE 2 a bunch of particles which, as is known, must be tied or related in phase in such a manner as to find itself ahead of the configuration of the lines of force 3, the portion "ahead" being determined by the direction of movement of the bunch indicated by the arrow 5. One sees immediately that the field acting on the bunch 4 in this "ahead" portion comprises an axial component $E_z$ directed in the same direction as the beam, thus accelerating the particles, and a radical component $E_r$ directed toward the outside, therefore tending to defocus the bunch 4. In the usual prior art accelerators, one corrects this defocusing effect by magnetic focusing coils. However, the weight, the encumbrance, the cost and the energy consumption thereof are high. The present invention aims at an improvement to suppress these focusing coils and to realize an accelerator with focusing by the high frequency field.

To understand the mode of action of the improvement which will be described, reference is again made to FIGURE 1 in which are shown in dashed lines the distribution of the lines of force of the field of the first space harmonic, co-existing with the fundamental whose lines of force are designated by reference numeral 3. The lines of force 6 of the first space harmonic have the shape of a network of hyperbolas which become more and more dense toward the periphery of the circle 1, which corresponds to the anti-symmetric character of amplitude distribution of this harmonic. This amplitude is zero at the center of the circle 1 and increases toward the periphery. Furthermore, these lines of force have no axial component but are contained in the planes of the orifices 1 as shown by the dash lines 6 of FIGURE 2. This harmonic propagates with a velocity different from that of the bunch 4 (whose velocity is that of the fundamental and therefore different from that of the first space harmonic), hence there is no interaction with the first space harmonic; the first space harmonic therefore does not participate in the accelerating action. In contrast, the lines of force 6 being hyperbolic, the field comprises always a component such as $E_x$ which is directed toward the axis and exerts therefore a focusing effect; and a component such as $E_y$ which is directed toward the outside and exerts a defocusing effect which adds to that of the radial component $E_r$ indicated in FIGURE 2.

Nevertheless, in the known devices with circular orifices, this effect, which is as much focusing as defocusing, is negligible, for the maximum amplitude of the first harmonic (amplitude of the field at the periphery of the circle 1) is very much less than the maximum amplitude of the fundamental (amplitude of the field in the center).

If, in contrast, one could favor the components such as $E_x$ with respect to the amplitude of the fundamental field, the focusing exerted by these favored components could compensate the defocusing action due to diverse other components, and the necessity to employ magnetic coils could be avoided.

In accordance with the invention, there is provided a delay line for an accelerator with focusing means using the high frequency field, comprising periodic elements into which are pierced orifices permitting the movement of the accelerated beam along the axis of the line. These orifices have a non-circular shape symmetric with respect to two orthogonal axes, and elongated according to one of these axes, and that the position thereof in space is displaced by a fixed angle when passing from one to the next element.

These orifices may therefore have the shape of a rectangular slot, of an elliptical slot, of an oval slot, of two parallel lines joined at each end by a semi-circle, etc. The displacement angle may be 90°, 60°, or 45° etc. and in general may be $\pi/n$, where $n$ is any desired integer number.

The theory developed by applicants has established that by these means one increases considerably the maximum amplitude of an anti-symmetric harmonic relative to the maximum amplitude of the symmetric components utilized for the interaction. In this manner, certain components of the field of the anti-symmetric harmonic are sufficiently increased to achieve the focusing effect compensating for the defocusing effect of the beam without any magnetic means.

Figure 3:
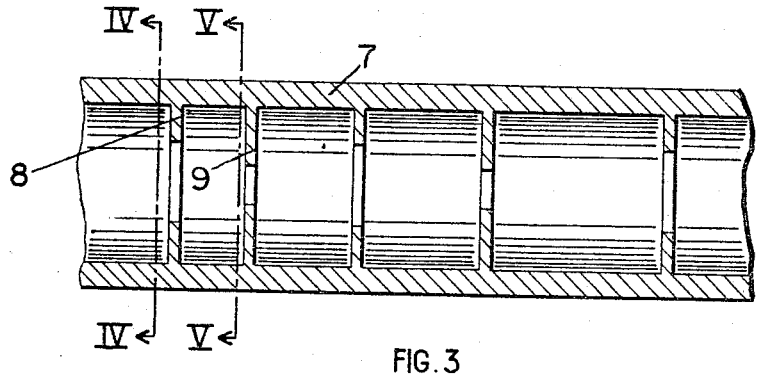
FIGURE 3 is a longitudinal cross sectional view through a first embodiment of a delay line provided with irises according to the present invention.
Figure 4:
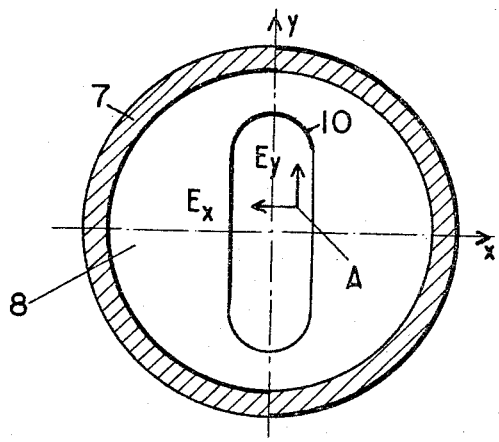
FIGURE 4 is a cross sectional view taken along line IV—IV of FIGURE 3.
Figure 5:
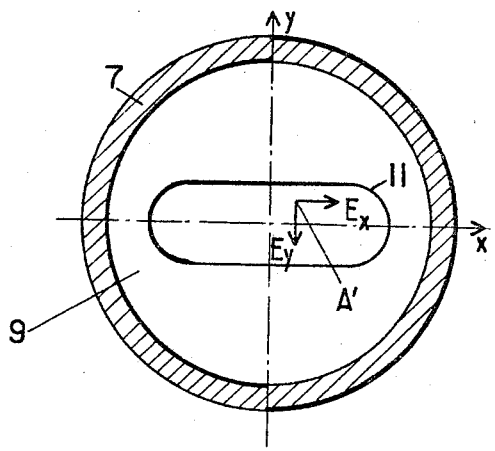
FIGURE 5 is a cross sectional view taken along line V—V of FIGURE 3.

FIGURE 3 represents a longitudinal cross section of a wave guide with irises, composed of a cylinder 7 loaded with transverse diaphragms alternately of type 8 (FIG. 4) and of type 9 (FIG. 5) FIGURES 4 and 5 represent transverse cross sections of FIGURE 3 taken along lines IV—IV and V—V, respectively. According to the present invention, these diaphragms 8 and 9 are pierced with elongated orifices 10 and 11, respectively, symmetrical with respect to two orthogonal axes and having a symmetry within the axis of the guide. These orifices may, for example, be in the form of two parallel lines joined at each end by a semi-circle, and cross one another, for example, at right angle, that is, with successive angular displacement of 90°.

Figure 6:
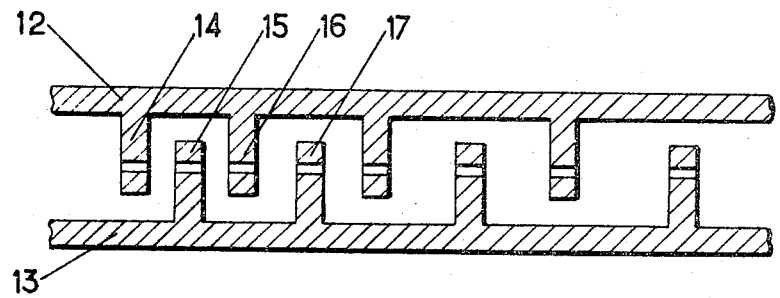
FIGURE 6 is a longitudinal cross sectional view through an interdigital delay line whose fingers are provided with a second modified embodiment in accordance with the present invention.
Figure 7:
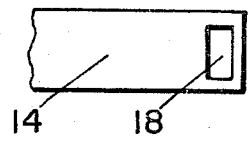
FIGURES 7 through 10 are partial elevational views of the various fingers of the delay line of FIGURE 6.
Figure 8:
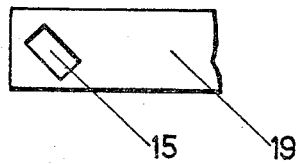
Figure 9:
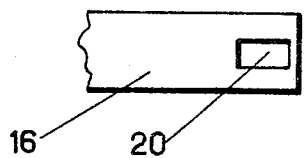
Figure 10:
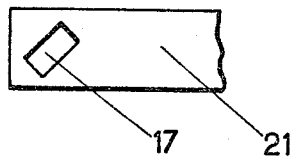

FIGURE 6 represents a cross section in plan view of an interdigital line with variable pitch comprising two combs 12 and 13 with fingers 14, 15, 16, 17, etc. FIGURES 7, 8, 9, and 10 represent the front elevational views of the different fingers 14, 15, 16 and 17. These figures show that the fingers are pierced, within the axis of the line, with orifices 18, 19, 20 and 21 which in this example are rectangular and displaced in space by 45° from one finger to the next.

Figure 11:
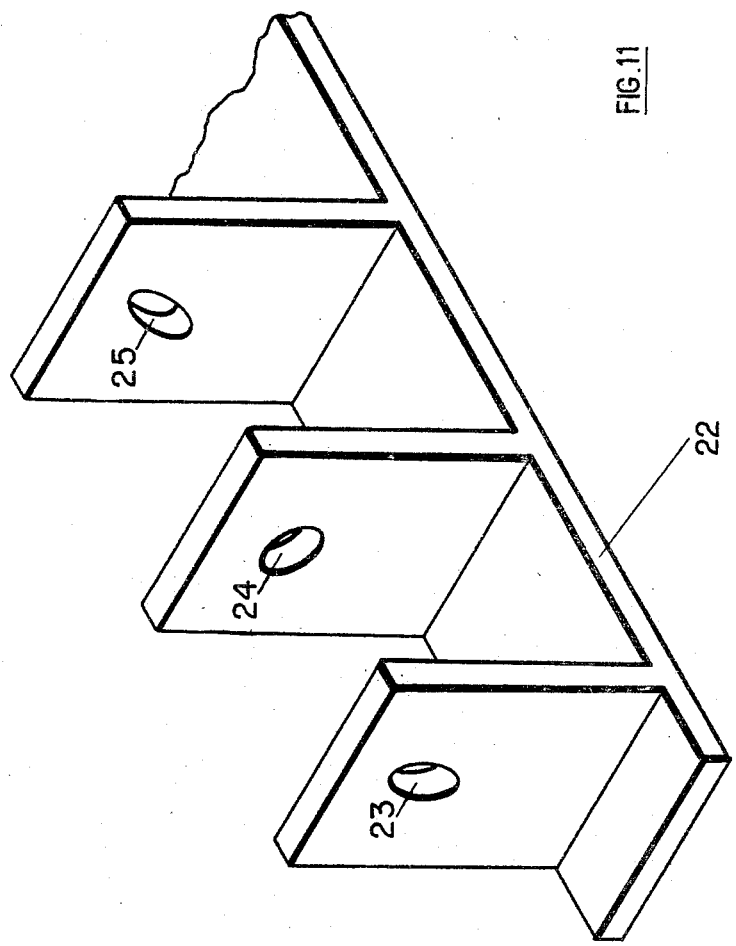
FIGURE 11 is a partial perspective view of a ladder-type delay line provided with a third embodiment of the present invention.

FIGURE 11 represents a perspective view of a ladder-type line 22 whose plates are pierced, within the desired axis of propagation of the beam, with orifices 23, 24, and 25 which in this example are oval and successively displaced by 60°.

FIGURE 12 illustrates the application of the present invention to an accelerator delay line as described in the U.S. patent application, filed by H. Leboutet and G. Vincent on June 28, 1963, Ser. No. 291,337, and assigned to the assignee of the present application. In FIGURE 12, there is shown in perspective view the essential parts of this circuit, comprising, within a resonant parallelepipedic cavity (not shown), a conductor 26 of meander shape disposed within a certain plane and passing in slalom fashion between a series of drift tubes 27. Drift tubes 27 are supported by rods 28 forming an interdigital line in the plane perpendicular to the meander, these rods 28 being connected to the envelope (not shown). Inserted into the conductor 26 are rings 29 aligned with the apertures of the drift tubes 27 to permit passage of the beam. According to the present invention, the apertures within the tubes 27 and the rings 29 are, for example, elliptical and cross each other at right angle, the elongation of the orifice taking place in the planes, respectively, of the meander 26 and of the rods 28.

FIGURE 13 represents an orifice 30 of more elaborated shape, which may be utilized in the place of the corresponding orifices in any of the aforementioned described examples. The contour of this orifice being composed of hyperbolic arcs 31 connected by circular portions 32, the entirety resembling in general a dumb-bell. This contour is particularly well suited to the hyperbolic form of the network of the lines of force of the anti-symmetric field, indicated in FIGURE 1.

It is understood that the circuits described above are intended to be utilized in accelerators of which the other elements such as the particle sources, target, envelope, pumping circuits, and direct-current as well as high frequency supply circuits have not been described since they are completely conventional. These accelerators will only be noticeable by the absence of any magnetic focusing means, though the present invention equally encompasses the devices in which one deems desirables to dispose magnetic windings in addition to the focusing action by the high frequency field realized by the means of the present invention.

Operation

The devices described above operate as follows:

By referring, for example, to the diaphragms with orifices crossing one another at right angles, as shown in FIGURES 4 and 5, let it be assumed that a particle of the beam has a tendency to leave the axis and displace itself, for example, to the right in the direction of the coordinate $x$. While passing through the diaphragm 8, it enters into the field of the anti-symmetric harmonic in such a manner that it is subjected, at the point A of FIGURE 4, to a focusing force of the field $E_x$. By continuing its movement and while passing through the diaphragm 9, it "sees" the field of the anti-symmetric harmonic in phase opposition with the diaphragm 8 since this harmonic does not propagate in synchronism with the particle. Consequently, the components $E_x$ and $E_y$ of FIGURE 4 rotate by 180° such that at point A' of FIGURE 5 whose coordinates are the same as those of point A in FIGURE 4, the particle is subjected, by the component $E_x$, to a defocusing force. The successive diaphragms therefore behave as alternately convergent, and, divergent lenses and if the amplitude of $E_x$ is sufficiently strong (which is obtained by the artifice of elongation and angular displacement of these orifices), it is known that the resultant action is a focusing action, by an effect analogous to the strong focusing (magnetic focusing by the passage of the particle alternatively in a stronger and weaker magnetic field), utilized in certain cyclotrons.

Furthermore, the more the particle deviates from the axis, the stronger becomes the focusing field into which it enters (by reason of the anti-symmetric distribution), and the corrective action is therefore more energetic.

The phenomena take place in an analogous manner in the plane of the coordinate $y$, and the explanation of the operation is analogous when the angular displacement is not $\pi/2$ but is generally $\pi/n$.

While we have shown and described several embodiments in accordance with the present invention, it is understood that the same is not limited thereto but is susceptible of numerous changes and modifications as known to a person skilled in the art. For example, the present invention is not limited to the specific embodiments described herein but encompasses all modifications, for example, its applications to other prior art delay lines, as known to persons skilled in the art. Consequently, we do not wish to be limited to the details shown and described herein but intend to cover all such changes and modifications as are encompassed by the scope of the appended claims.

We claim:

1. In a linear travelling wave particle accelerator, a delay line structure, comprising:
    a series of spaced elements within said delay line structure,
    each of said elements having aperture means substantially symmetrical with respect to two orthogonal axes,
    the centers of said aperture means being substantially aligned along the axis of said accelerator to allow passage of the beam of accelerated particles,
    the shape of each of said aperture means being elongated substantially along one of said orthogonal axes,
    and the spatial position of successive aperture means being shifted by a predetermined substantially fixed angle from one to the next of the said elements.

2. A delay line structure for a linear particle accelerator according to claim 1, wherein the shape of said aperture means is substantially rectangular.

3. A delay line structure for a linear particle accelerator according to claim 1, wherein the shape of said aperture means is substantially elliptical.

4. A delay line structure for a linear particle accelerator according to claim 1, wherein the shape of said aperture means is substantially oval.

5. A delay line structure for a linear particle accelerator according to claim 1, wherein said aperture means are substantially shaped two parallel sides joined at each end by a semi-circle.

6. A delay line structure for a linear particle accelerator according to claim 1, wherein the shape of said aperture means substantially resembles a dumb-bell.

7. A delay line structure as claimed in claim 6, wherein the contour of said dumb-bell is composed of arcs of hyperbola joined by arcs of circle.

8. In a travelling wave particle accelerator, a delay line structure, comprising:
    a series of spaced elements within said delay line structure,
    each of said elements having aperture means substantially symmetrical with respect to two orthogonal axes,
    the centers of said aperture means being substantially aligned along the path of travel of the beam of particles to be accelerated,
    and means for effecting a strong focusing action on the particles of said beam by the anti-symmetric distribution of the lines of force of a space harmonic in said delay line structure which is non-synchronous with the movement of the beam including aperture means in said elements with dissimilar dimensions in two orthogonal planes and angularly displaced with respect to one another.

9. In a linear travelling wave particle accelerator, a delay line structure, comprising:
    a series of spaced elements within said delay line structure,
    each of said elements having aperture means substantially symmetrical with respect to two orthogonal axes,
    the centers of said aperture means being substantially aligned along the axis of said accelerator to allow passage of the beam of accelerated particles,
    the shape of each of said aperture means being elongated substantially along one of said orthogonal axes,
    and the spatial position of successive aperture means being shifted by a predetermined substantially fixed angle from one to the next of the said elements,
    the shifting angle being equal to $\pi/n$, $n$ being equal to any interger number higher than unity.

References Cited
UNITED STATES PATENTS

| | | | |
|---|---|---|---|
| 3,067,359 | 12/1962 | Pottier | 315—5.42 |
| 3,099,767 | 7/1963 | Gross | 333—31 |
| 3,153,767 | 10/1967 | Kyhl | 315—5.42 |

JAMES W. LAWRENCE, *Primary Examiner.*

S. SCHLOSSER, *Assistant Examiner.*